H. CSANYI.
SECONDARY BATTERY CELL.
APPLICATION FILED FEB. 27, 1917.
1,279,280.
Patented Sept. 17, 1918.
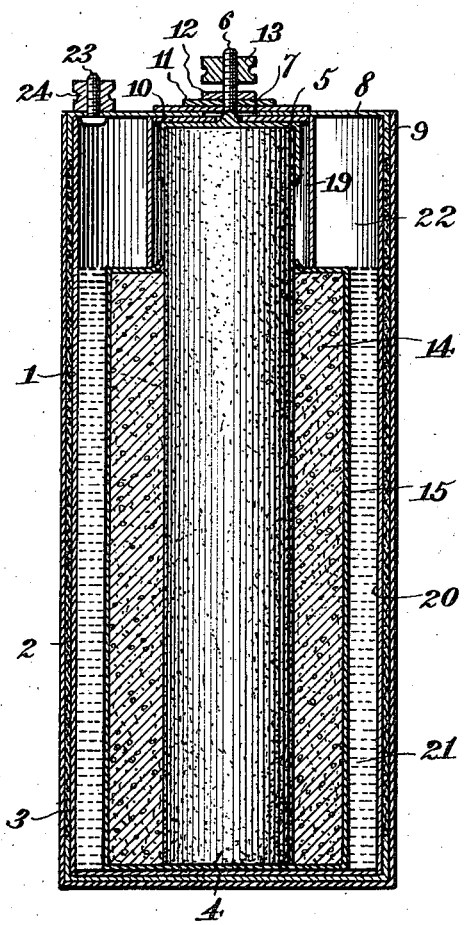
Inventor,
Henry Csanyi.
By his Attorneys,

UNITED STATES PATENT OFFICE.

HENRY CSANYI, OF NEW YORK, N. Y.

SECONDARY BATTERY-CELL.

1,279,280.  Specification of Letters Patent.  Patented Sept. 17, 1918.

Application filed February 27, 1917. Serial No. 151,216.

*To all whom it may concern:*

Be it known that I, HENRY CSANYI, a citizen of the United States, residing at New York, in the county of New York and State of New York, have invented certain new and useful Improvements in Secondary Battery-Cells, of which the following is a specification.

This invention relates to electric batteries and has particular application to the chemical composition or constituents of both the electrolyte and depolarizer of secondary cells or accumulators.

In the present instance it is my purpose to dispense with the sulfuric acid or alkali ordinarily employed in battery cells of the type to which my invention pertains, using instead a chlorid so that I obtain a powerful efficient cell which is capable of a large current output and will last a relatively long time without re-charging, although such cell may be readily re-charged when necessary.

One distinct advantage which my battery cells possess over secondary cells using sulfuric acid or alkali is that it may be kept for months in an inactive condition without deterioration or loss of power.

With the above recited objects and others of a similar nature in view, my invention consists in the improved battery cell set forth in and falling within the scope of the appended claims.

In the accompanying drawing,

The figure is a vertical central view taken through a battery cell embodying my invention.

Referring to the figure of the drawing wherein I have illustrated one arranged battery cell wherein my invention is incorporated, the numeral 1 indicates a shell or casing of suitable metal, such as zinc or lead, which is preferably cylindrical in form and has its outer face provided with a coating of coal tar or other suitable material 2, faced or enveloped in paper indicated at 3, thereby insulating the shell. Located within the casing and extending centrally and longitudinally thereof is the carbon stick 4 forming the positive electrode, the upper end of this electrode being surmounted by a metallic cap 5 from which projects the upwardly extending threaded shank 6 constituting the positive terminal of the battery, the cap and shank being preferably made of brass. This threaded shank 6 extends through an aperture 7 formed centrally of the metallic top 8 of the shell 1, such top having a depending circumferential flange 9 which fits snugly over the upper end of the shell so as to make a tight fit. A disk 10 of paste-board, fiber, paper or other suitable material rests on top of the brass cap 5 and when the battery is assembled lies between this cap and the adjacent portion of the under face of the shell top 8, the threaded shank 6 passing through this disk and through the washers 11 and 12 which are imposed on the outer face of the shell top and overlie the central opening 7 therein. When the nut 13 which is threaded onto the shank and which forms a binding nut for the end of the positive conductor wire, is screwed down in position it will act to hold the top with the washers and disk firmly in place, thus completely and positively closing and sealing the battery cell and preventing the escape or spilling of any of the fluid contents thereof. The carbon electrode 4 preferably has the greater portion of its length from the bottom end to the top thereof surrounded by the depolarizing compound or material indicated at 14. This depolarizing compound or material, which enters into my invention, is in the present instance, in the nature of a paste-like compound, preferably made up of approximately 70% red lead ($Pb_3O_4$); 21% graphite (C) and 9% ammonium chlorid ($H_4NCl$), although I wish it to be understood that the depolarizing composition is not necessarily limited to being formed of these precise proportions. The graphite or carbon is added for the purpose of increasing the conductivity of the depolarizing compound or material. These ingredients are preferably intimately mixed or worked up and applied, in the form of a smooth paste, as shown in the drawing. The depolarizing compound or material thus applied may be faced with a layer or covering of filter paper shown at 15, which layer extends beneath the bottom of the carbon stick or electrode 4, and if desired, this filter paper may be covered or faced with a thin pervious fabric, such as cheese cloth. As will be seen by the drawing, the upper end of the carbon electrode is not surrounded or embedded in the depolarizer material and this exposed upper end portion is preferably treated or coated with coal tar and is then housed or incased in a sleeve 19 of suitable fibrous material, such as paper, the upper end of which bears against the top of the shell 1, while the lower end of the sleeve rests on top of the depolarizer body arranged as hereinbefore mentioned. As will be seen by reference to Fig. 1, when the carbon electrode with the surrounding depolarizing material is placed or seated in the zinc or lead shell 1 and annular space or chamber 20 is formed between the depolarizer material and the inner face of the shell and this space or chamber is intended to be filled with the electrolyte embraced within my invention, such electrolyte being shown at 21.

In the present instance this electrolyte preferably consists of 80% water ($H_2O$); 12% ammonium chlorid ($H_4NCl$); 6% zinc chlorid ($ZnCl_2$) and 2% salt ($NaCl$), although it will of course be understood that in making up the electrolyte I do not limit myself to these precise proportions, as such proportions may be varied without departing from the invention. If it is desired to give to the electrolyte a paste-like consistency I may add suitable substances for this purpose, such, for instance, as potato flour 2 parts, wheat flour 1 part and a small amount of gelatin, say 2 grams. The electrolyte is preferably poured in until its level is flush with the top of the mass or body of depolarizing material as illustrated in Fig. 1, a wide annular space 22 being formed at the upper end portion of the shell, and this space forms a circular air chamber so that any small amount of vapor which generates in the battery will condense in this chamber and the fluid products of condensation will flow or drop back into the electrolyte. The negative electrode of the battery is of course formed by the shell 1, and the top 9 thereof is preferably provided with a terminal or post 23 having the usual building nut 24, a conductor wire being intended of course to be attached to this negative binding post or terminal. The positive electrode and the depolarizing material, or composition material surrounding the same may be maintained stationary or in proper position within the shell by any suitable means such as by spacer members of any preferred construction (not shown).

The above is a brief description of one construction of cell employing the depolarizer and electrolyte chemical constituted in accordance with my invention. When the cell is ready for charging the electrolyte, as above recited, in solution form includes water, ammonium chlorid and zinc chlorid, to which some salt is added to hasten the action, and in some instances, flour and gelatin to give the electrolyte a pasty consistency. For the depolarizer we have the composition of red lead, graphite and ammonium chlorid. During the charging of the cell with the electric current, certain chemical changes take place, as under the action of the charging current the zinc is deposited on the negative electrode and the chlorin is released and combines at the positive electrode with the red lead of the depolarizer to form lead chlorid and lead super-oxid. But, when the cell is in use, and consequently discharging, the chemical changes or action which takes place results as follows: At the negative electrode the zinc is deposited and the ammonium chlorid dissolves the zinc producing zinc chlorid and setting the ammonia free, and which ammonia in turn combines at the positive electrode with the lead chlorid, releasing the chlorin from the lead and the chlorin combines with the ammonia and produces ammonium chlorid, thus producing the condition originally existing prior to the charging of the cell.

Experience has shown that a battery cell constituted as herein described will last for months without deterioration, when not in use, and when in use, will possess relatively great current producing capacity without the necessity of frequent re-charging. In addition to these advantages this secondary battery or accumulator may be made somewhat after the manner of a dry battery, this being conducive to the long life and efficiency of the cell.

What I claim is:

1. A secondary battery including a negative electrode of metal and a positive electrode of carbon and having an electrolyte including ammonium chlorid and zinc chlorid, and a depolarizer including ammonium chlorid, carbon and red lead, whereby upon the charging of the battery with an electric current zinc will be deposited at the negative electrode and chlorin released to combine at the positive electrode with the red lead of the depolarizer to form lead chlorid and lead superoxid at said positive electrode, the subsequent electrical discharge of the cell causing such chemical reaction as to restore the electrolyte and depolarizer to the condition existing prior to the charging of the cell.

2. A secondary battery including a positive electrode and a container forming a negative electrode and an electrolyte including ammonium chlorid and zinc chlorid and a depolarizer including ammonium chlorid, graphite and red lead, whereby upon the charging of the battery with an electric current zinc will be deposited at the negative electrode and chlorin released to combine at the positive electrode with the red lead of the depolarizer to form lead chlorid and lead superoxid, the subsequent electrical discharge of the cell causing such chemical reaction as to restore the electrolyte and depolarizer to the condition existing prior to the charging of the cell.

3. The herein described method which comprises placing in a metallic container electrolyte comprising water, ammonium chlorid, and zinc chlorid, said container forming a negative electrode, placing a positive electrode of carbon in said container, surrounding said carbon electrode with a depolarizer including ammonium chlorid, carbon and red lead and separating the depolarizer from the electrolyte with a layer of filtering material, charging said battery with an electric current to cause a deposit of zinc at the negative electrode and the release of chlorin, and the combination of the latter at the positive electrode with the red lead and carbon at the depolarizer to form lead chlorid and lead superoxid and subsequently discharging the battery to cause such chemical reaction as will restore the electrolyte and depolarizer to the condition originally existing prior to the charging of the battery.

In testimony whereof I affix my signature.

HENRY CSANYI.